United States Patent [19]

Tsunoda et al.

[11] 3,714,826
[45] Feb. 6, 1973

[54] INDUCTION LIQUID FLOW METER AND METHOD OF ELECTROMAGNETICALLY DETERMINING FLOW RATE OF LIQUID

[75] Inventors: Yorio Tsunoda, Kawasaki; Shigeyuki Takamatu, Totsuka-ku, Yokohama, both of Japan

[73] Assignee: Tokyo Shibaura Electric Co., Ltd., Kawasaki-shi, Japan

[22] Filed: March 5, 1971

[21] Appl. No.: 121,435

[30] Foreign Application Priority Data

March 10, 1970 Japan ................................ 45/19691

[52] U.S. Cl. ............................................ 73/194 EM
[51] Int. Cl. ............................ G01f 1/00, G01p 5/08
[58] Field of Search ...................... 73/194 E, 194 EM

[56] References Cited

FOREIGN PATENTS OR APPLICATIONS

| 142,783 | 12/1966 | U.S.S.R. | 73/194 EM |
|---|---|---|---|
| 166,516 | 3/1965 | U.S.S.R. | 73/194 EM |
| 169,816 | 9/1965 | U.S.S.R. | 73/194 EM |

*Primary Examiner*—Charles A. Ruehl
*Attorney*—Flynn & Frishauf

[57] ABSTRACT

An induction liquid flow meter wherein a device for generating a magnetic field shifting along a liquid passage is energized from a power source of fixed frequency. The power P supplied to the magnetic field generating device is measured and the slip $s$ is determined from the measured power P. The flow rate V of the liquid through the liquid passage is then determined from the measured value of slip $s$ in accordance with a predetermined relationship between slip $s$ and flow rate V.

6 Claims, 7 Drawing Figures

INDUCTION LIQUID FLOW METER AND METHOD OF ELECTRO-MAGNETICALLY DETERMINING FLOW RATE OF LIQUID

BACKGROUND OF THE INVENTION

The present invention relates to an induction liquid flow meter and method of electromagnetically determining the flow rate of liquid.

A prior art induction liquid flow meter comprises a pair of electrodes disposed on the inner wall of a pipe allowing the passage of liquid so as to face each other in a direction intersecting said passage at right angles and means for generating a magnetic flux in a perpendicular direction to that in which the electrodes face each other. From the electrodes is drawn out the voltage of an electromotive force generated in a certain functional relationship with the flow rate of liquid, and said voltage is used in determining the flow rate. Another prior art flow meter comprises three solenoids disposed at an equal interval along the passage of liquid. The central solenoid is energized to generate a magnetic flux to detect different voltages induced into the solenoids at both ends by said magnetic flux and the balance between said different voltages is used as a reference in measuring the flow rate of liquid.

The above-mentioned conventional types of flow meter present measured outputs in the form of electrical energy, indeed offering advantage in effecting automatic recording and control, issuing alarms and making digital indications. With the prior art types, however, there is always needed correction because determination is conducted indirectly.

If determination is made on the flow rate of liquid, for example, water which presents no difficulties or danger in handling, then the aforesaid correction will not be required. Where, however, measurement should be conducted on the flow rate of liquid, for example, liquid sodium increasingly used in recent years as a coolant in a fast neutron reactor which is extremely active and whose handling is accompanied with serious danger, then there will be required considerable work and cost in carrying out said correction.

The present invention has been accomplished in view of the aforesaid drawbacks and is intended to provide a novel type of flow meter based on an entirely different operating principle from that of the prior art flow meter.

There will first be described the fundamental principle on which a flow meter according to the present invention is based. The present invention originates with the attention paid to the operating principle of a linear induction pump used in passing conductive liquid, that is, application of the slip of shifting magnetic field generated in the linear induction pump with respect to the speed at which liquid travels through a passage, thereby determining the flow rate of said liquid without any correction, if desired.

The linear induction pump generally comprises a pair of magnetic field generating devices facing each other across a passage of liquid, each having three-phase electromagnetic coils disposed in the slots of an iron core. These generating devices are supplied with three-phase power to generate a shifting magnetic field so as to pass conductive liquid.

With a distance between the adjacent poles designated as $\lambda$ cm, then effective power $P$ required to conduct liquid through a passage defined between said adjacent poles may be expressed by the following equation $$P = \frac{A H_p^2 \lambda^3}{2 \times 10^{16} \rho} \cdot f^2 s \qquad (1)$$

where:

$A$ = constant cm$^2$ associated with the cross sectional area of a liquid passage $H_p$ = intensity of a magnetic field expressed in oersted $\rho$ = specific resistivity of liquid $\Omega$cm $s$ = slip (nondimensional)

Since the entire length of a linear induction pump is naturally an integral multiple $n$ of $\lambda$, the effective power $P_0$ of the pump as a whole may be given as $$P_0 = K f^2 s \qquad (2)$$

where:

$$K = n \cdot \frac{A H_p^2 \lambda^3}{2 \times 10^{16} \rho} \text{ watt sec.}^2/H_p^2$$

The above equation shows that power $P$ or $P_0$ is proportionate to the square of the frequency $f$ and also to the slip $s$. The velocity $V$ of liquid in the passage may be indicated as $$V = \lambda f (1 - s) \qquad (3)$$

If the frequency $f$ of power impressed on the electrode is varied to render $\lambda f$ (this is expressed as synchronization velocity $Vs$) equal to the velocity $V$ of liquid as $$V = \lambda f \qquad (4)$$

then the slip $s$ will be zero, and the following equation will result from the equation (2)

$$P = 0 \qquad (5)$$

It will be seen, therefore, that if, based on the principle of the aforementioned linear induction pump, there is introduced through said pump liquid whose flow rate it is desired to determine and the frequency of power supplied to the magnetic field generating device is varied to determine the frequency $f_0$ when the power thus supplied is reduced to zero, then said frequency $f_0$ can be used in measuring the flow rate.

If the test liquid is of the type which does not present any difficulties in correction, the flow rate of said liquid can be determined from the effective power measured by fixing the frequency of power supplied to the magnetic field generating device of the linear induction pump.

In this case, the effective power $P$ of the induction pump and slip $s$ has the relationship $$P = K's \qquad (6)$$

where:

$$K' = K f^2$$

Substitution in the equation (6) above of the measured value of power supplied to the magnetic field generating device will determine the slip $s$. When the value of the slip $s$ thus determined is substituted in the equation (3), the velocity of liquid will be obtained.

As seen from the foregoing description, when the frequency of power supplied to a device for generating a magnetic field shifting along the passage of liquid is varied and the frequency of said power is detected when it attains a prescribed value, the flow rate of liquid can be computed from the frequency thus detected.

In accordance with the present invention there is provided an induction liquid flow meter wherein there is measured the power supplied to a device for generating a magnetic field shifting along the passage of liquid to determine the flow rate of liquid from the measured magnitude of power. The frequency of the input power is maintained constant.

BRIEF DESCRIPTION OF THE DRAWINGS

FIG. 1 represents sectional views of an induction liquid flow meter according to an embodiment of the present invention;

DETAILED DESCRIPTION OF THE INVENTION

Figure 1A:
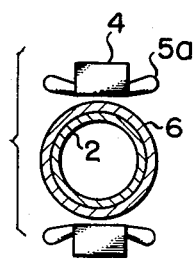
FIG. 1A is an elevation of the same.
Figure 1B:
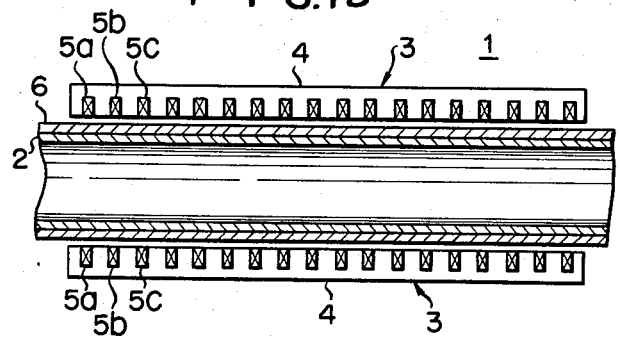
FIG. 1B is a side view of the same.
Figure 2:
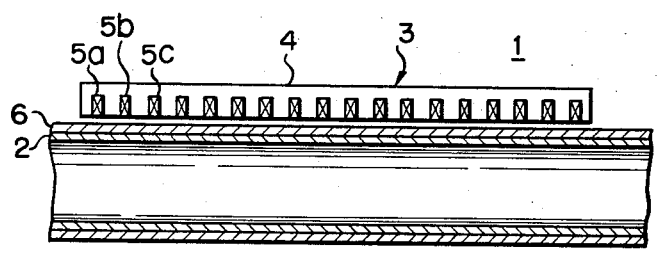
FIG. 2 is a longitudinal sectional view of an induction liquid flow meter according to another embodiment of the invention.

Referring to FIGS. 1A and 1B, a flow rate detection unit is comprised of a pair of magnetic field generating devices 3 facing each other across a pipe of liquid so as to generate a magnetic field shifting along the passage of liquid. EAch generating device 3 comprises a plurality of (for example, six to eight) three-phase coils $5a$, $5b$, $5c$ . . . received in the slits of an iron core 4. The outer periphery of the liquid pipe 2 is covered with a heat insulating layer 6 to prevent temperature rise therein. The magnetic field generating device 3 may be disposed, as shown in FIG. 2, only on one side of the liquid pipe 2.

Figure 3:
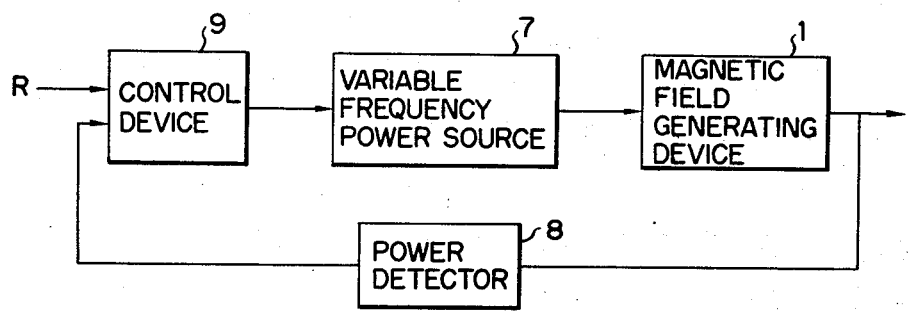
FIG. 3 is a block circuit diagram of the induction liquid flow meter of the invention.

There will now be described by reference to the block circuit diagram of FIG. 3 the operation of an induction liquid flow meter according to the present invention. A variable frequency power source 7 supplies power to the three-phase electromagnetic coils of the flow rate detection unit 1. The power is measured by a watt meter 8 and the measured output is fed back to a control device 9 which is used to control the frequency of the power source 7 by comparing said output fed back thereto with the later described referential value R. The frequency of the power supplied to the magnetic field generating device should preferably be of the order of 5 to 100 Hz. Too high a frequency results in a narrow magnetic field and in consequence a weak detection output from said generating device, thus presenting difficulties in measuring the flow rate of liquid.

Figure 4:
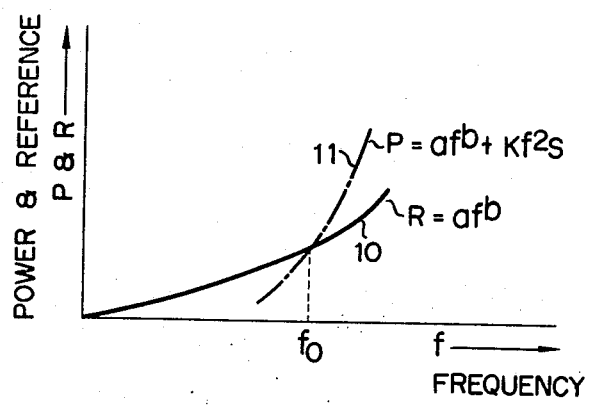
FIG. 4 graphically illustrates the relationship of the frequency of a power source versus the effective power P supplied to a magnetic field generating device and the referential value R.

As mentioned above, the present invention resides in varying the frequency of the power source 7, detecting the frequency $f_0$ when the power P from said source 7 is reduced to zero and computing the liquid velocity V from said frequency $f_0$. However, this is a theoretical discussion. Since, in fact, there occurs some loss of energy depending on the component material of, for example, the aforesaid core 4, it is difficult to realize P = O. In general, therefore, the power P is expressed as $$P = af^b + Kf^2 \quad (7)$$

Where $af^b$ denotes the aforementioned loss of energy ($a$ and $b$ are constants; $b \leq 2$), or the power where there flows no liquid through the pipe 2. The referential value R of FIG. 3 is equal to the lost portion $af^b$ of said power and varies with the frequency of the power source 7. Referring to FIG. 4, the curve 10 denotes the above-mentioned power loss, that is, the referential value R, and the curve 11 shows the effective power P. When the frequency $f_0$ at the intersection of the curves 10 and 11, that is, when the effective power P becomes equal to the referential value R is substituted in the equation (4) above, there is determined the liquid velocity V. The frequency $f_0$ is detected from the control device 9 and used in regulating the frequency of the power source 7. The control device 9 may be provided with an operation circuit for computing liquid velocity V from the frequency $f_0$.

The foregoing description relates to the case where the flow rate of liquid was determined by varying the frequency of the power source 7. Where the frequency of the signal supplied to the coil is fixed, the power P may be given as $$P = K_0 + K's \quad (K = \text{constant watt}) \quad (8)$$

If, therefore, the slip $s$ of the shifting magnetic field is determined for a given liquid velocity V using the following equation $$s = (P - K_0)/K' \quad (9)$$

where P is measured and $K_0$ and $K'$ are constants, then the flow rate of liquid can be computed by determining the liquid velocity $V$ from the equation $$V = fs(1-s) \quad (10)$$

which is derived from the equation $$s = (f-V)/f \quad (11)$$

Figure 6:
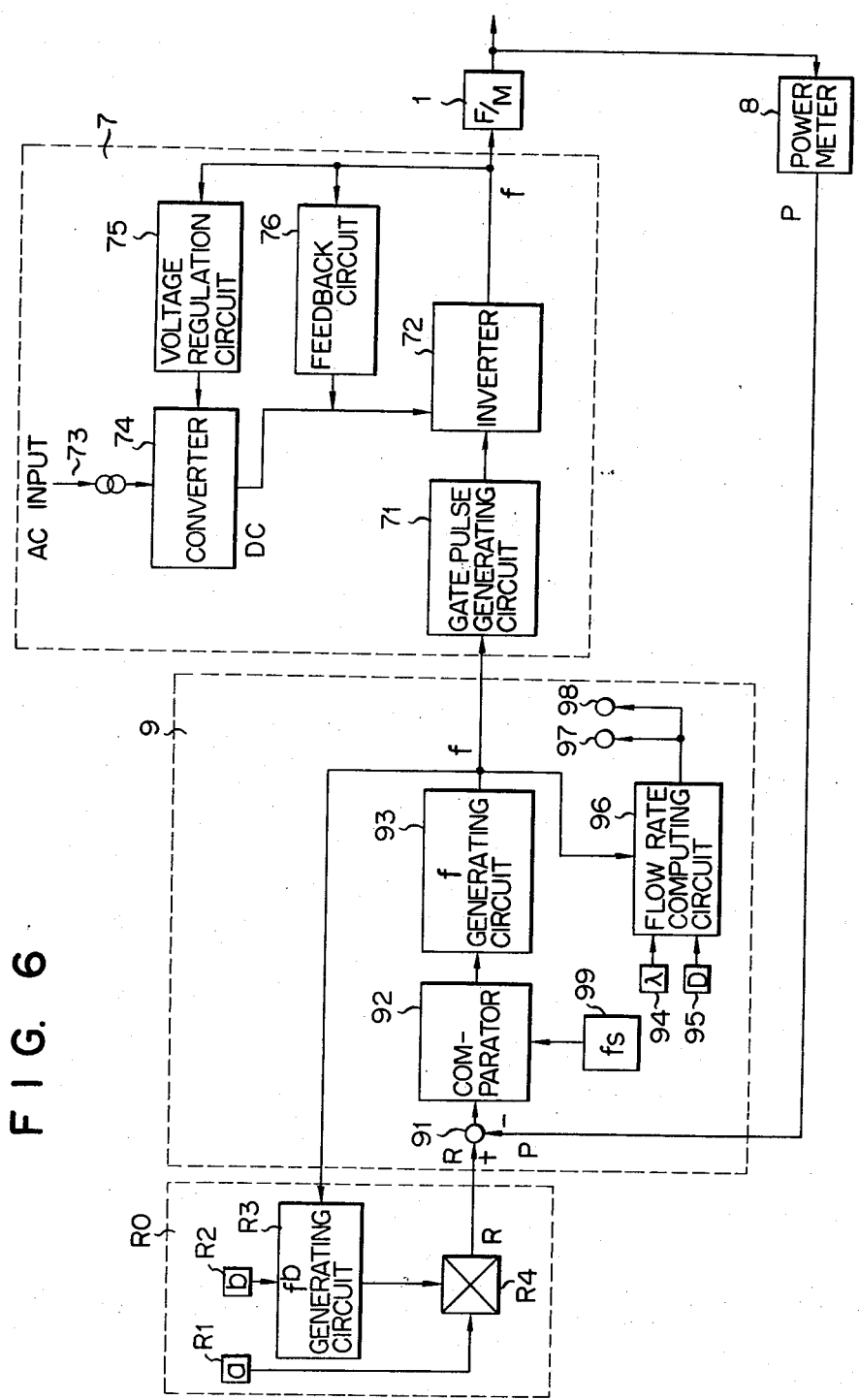
FIG. 6 shows a detailed block circuit diagram of FIG. 3.

There will now be further detailed by reference to FIG. 6 the embodiment of FIG. 3. Referring to a circuit $R_0$ for generating a referential value R, the memory circuits $R_1$ and $R_2$ store constants $a$ and $b$ respectively. Output $f^b$ from a frequency $f^b$ generating circuit $R_3$ is multiplied by the constant $a$ stored in the memory circuit $R_1$ using a multiplier $R_4$. The output from said multiplier $R_4$ forms a referential value R.

Referring to the control device 9, a value P measured by the power meter 8 is composed with the referential value R by a comparator 91. Based on the result of said comparison, another comparator 92 determines whether the frequency $f$ should be increased or decreased. Based on the determination by said another comparator 92, the frequency $f$ of a circuit 93 is increased or decreased. In this case, the increase or decrease of the frequency $f$ of said circuit 93 starts with the constant frequency $fs$ of a constant frequency source 99. The output from the frequency $f$ generating circuit 93 is supplied to the variable frequency power source 7. On the other hand, the output frequency $f$ of said circuit 93 is operated on in a flow rate computing circuit 96 based on the relationship between the constant $\lambda$ 94 and another constant D 95, both used in determining the flow rate. This operation output is presented by an indicator 97 and recorded by a recorder 98.

Referring to the power source 7, AC input 73 is converted to a DC output by a converter 74. Said DC output is converted to an AC output having a desired frequency by an inverter 72 based on the output from a gate pulse generator 71 for producing gate pulses according to the aforesaid frequency $f$ of the circuit 93. There are further provided a feedback circuit 76 and voltage regulation circuit 75 to reduce the deformation of said AC output. The output from said inverter 72 is supplied to the magnetic field generator device 1. The resulting power is measured by the power meter 8, the measured power P being supplied to the control device 9.

Figure 5:
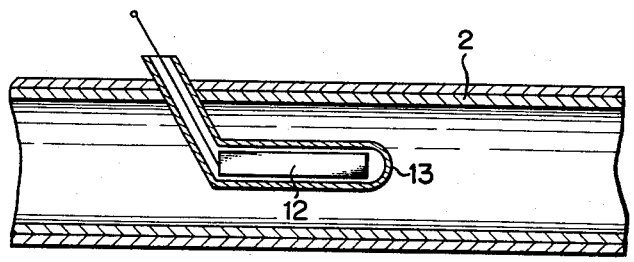
FIG. 5 represents an induction liquid flow meter according to another embodiment of the invention, wherein the magnetic field generating device is disposed in a liquid passage.

According to the embodiment of FIG. 5, the magnetic field generating device 12 is received in a pipe 13 coaxially placed in the liquid pipe 2 in a state completely shut off from the interior of the latter. The closed pipe 13 has an opening exposed to the outside of the liquid pipe 2, power being supplied to the magnetic field generating device 12 through said opening.

The magnetic field generating device of the present invention has essentially the same construction as that used in the linear induction pump. Unlike the pump, however, the flow meter of the present invention causes a shifting magnetic field to be generated simply to determine the velocity of liquid and not to carry forward said liquid, so that it can be made more compact.

In the embodiment of FIG. 1 there was used a round liquid pipe. However, the present invention is not limited to said round pipe, but permits the use of a flattened, angular or any other form of pipe. Further in the foregoing embodiments, there were used a pair of magnetic field generating devices facing each other across the liquid pipe. However, said generating devices may comprise an integral cylindrical body enclosing the liquid pipe, or several units arranged lengthwise around the outer periphery of said pipe. The magnetic field may be shifted in the same direction as, or in the opposite direction to, that in which the liquid flows. The flow meter of the present invention is applicable to liquid sodium, iron, bismuth, lithium, lead and other high conductivity liquids, and is particularly adapted for liquid sodium.

What we claim is:

1. A method of measuring the flow rate of liquid which comprises:
    supplying constant frequency alternating current to a magnetic field generating device for generating a magnetic field shifting along a liquid pipe;
    measuring the power supplied to said magnetic field generating device;
    determining the slip $s$ of said shifting magnetic field from the measured power P in accordance with a predetermined relationship between measured power $P$ and the slip $s$; and
    determining the flow rate $V$ of the liquid from the determined values of slip $s$ in accordance with a predetermined relationship between slip $s$ and flow rate $V$.

2. The method of claim 1 wherein said predetermined relationship between measured power $P$ and the slip $s$ is:

$$P = K_0 + K's$$

where $K_0$ and $K'$ are constants.

3. The method of claim 1 wherein said predetermined relationship between slip $s$ and flow rate $V$ is:

$V = F(1-s)$, where $f$ is the constant frequency of the alternating current supplied to said generating device.

4. An induction liquid flow meter comprising:
    at least one magnetic field generating device disposed along a pipe through which liquid is adapted to flow for generating a magnetic field shifting along said pipe;
    a power source supplying a constant frequency alternating current signal to said magnetic field generating device to energize said device;
    means for measuring the power supplied to said magnetic field generating device;
    means for determining the slip $s$ of said shifting magnetic field from the measurement of power in accordance with a predetermined relationship between said measured power and the slip; and
    means for determining the flow rate $V$ of the liquid from the determined values of slip in accordance with a predetermined relationship between flow rate and slip.

5. The flow meter according to claim 4 wherein said magnetic field generating device comprises a pair of units facing each other across said liquid pipe.

6. The flow meter according to claim 4 wherein said magnetic field generating device is received in a further pipe coaxially located in said liquid pipe in a state completely shut off from the interior of said liquid pipe, with the opening of said further pipe exposed to the outside of the liquid pipe.

* * * * *